United States Patent [19]
Nanno

[11] Patent Number: 5,088,701
[45] Date of Patent: Feb. 18, 1992

[54] FLUID-FILLED CYLINDRICAL ELASTIC MOUNT HAVING GROOVED MOVABLE BLOCK(S) IN FLUID CHAMBER(S)

[75] Inventor: Takanobu Nanno, Kasugai, Japan

[73] Assignee: Tokai Rubber Industries, Ltd., Aichi, Japan

[21] Appl. No.: 647,265

[22] Filed: Jan. 29, 1991

Related U.S. Application Data

[63] Continuation-in-part of Ser. No. 565,333, Aug. 10, 1990, abandoned.

[30] Foreign Application Priority Data

Aug. 21, 1989 [JP] Japan ................... 1-97386

[51] Int. Cl.⁵ ............................................. F16F 13/00
[52] U.S. Cl. ................... 267/140.1 C; 180/312; 248/562; 248/636; 267/219
[58] Field of Search ............. 267/140.1 R, 140.1 C, 267/219; 180/300, 312, 902; 249/562, 636

[56] References Cited

U.S. PATENT DOCUMENTS

| | | | |
|---|---|---|---|
| 4,605,207 | 8/1986 | Konishi | 267/140.1 X |
| 4,865,299 | 9/1989 | Goto | 267/140.1 |
| 4,998,345 | 3/1991 | Funahashi et al. | 248/636 X |

FOREIGN PATENT DOCUMENTS

| | | | |
|---|---|---|---|
| 3431460 | 3/1985 | Fed. Rep. of Germany. | |
| 3721444 | 1/1988 | Fed. Rep. of Germany. | |
| 144444 | 7/1986 | Japan | 267/219 |
| 290250 | 12/1986 | Japan | 267/140.1 |

*Primary Examiner*—George E. A. Halvosa
*Attorney, Agent, or Firm*—Oliff & Berridge

[57] ABSTRACT

A fluid-filled cylindrical elastic mount including an inner and an outer sleeve, an elastic body interposed between the two sleeves, at least one fluid chamber filled with a non-compressible fluid, and a flow-restricting member freely movably accommodated in the fluid chamber. A flow-restricting portion is provided around the flow-restricting member. The flow-restricting member has a pair of opposite end faces facing the axially opposite walls partially defining the fluid chamber. The flow-restricting portion includes a pair of axially spaced-apart sections defined by the axially opposite walls and the opposite end faces of the flow-restricting member, and a pair of radially spaced-apart sections defined by the flow-restricting member and the radially opposite walls of the fluid chamber. A sum of axial dimensions of the axially spaced-apart sections as measured in the axial direction of the mount is not more than 4 mm, and a sum of radial dimensions of the radially spaced-apart sections as measured in the radial direction is not more than 4 mm. At least one of the opposite end faces of the flow-restricting member has a plurality of grooves formed therein so as to extend in the radial direction. The grooves are spaced apart from each other in a circumferential direction of the mount, and communicate with a corresponding one of the axially spaced-apart sections in the axial direction, and the radially spaced-apart sections in the radial direction.

12 Claims, 4 Drawing Sheets

FLUID-FILLED CYLINDRICAL ELASTIC MOUNT HAVING GROOVED MOVABLE BLOCK(S) IN FLUID CHAMBER(S)

This is a Continuation-in-Part of application Ser. No. 07/565,333, filed b 8-10-90, abandoned.

BACKGROUND OF THE INVENTION

1. Field of the Invention

The present invention relates in general to a fluid-filled elastic mount which exhibits a high vibration damping effect based on flows of a highly viscous fluid contained therein. More particularly, the present invention is concerned with improvements in such a fluid-filled elastic mount which is capable of effectively damping input vibrations applied in both axial and radial directions of the mount.

2. Discussion of the Prior Art

There is known a vibration-damping cylindrical elastic mount of a type which is interposed between two members in a vibration transmitting system, for flexibly or elastically connecting these two members. The elastic mount has an inner and an outer sleeve which are disposed coaxially or eccentrically with each other, and an elastic body which are interposed between these sleeves for elastic connection thereof. For example, this type of elastic mount is suitably used as a body mount, member mount, engine mount, differential mount, or suspension bushing for a motor vehicle.

The conventional vibration-damping elastic mount constructed as described above relies only upon elastic deformation of the elastic body for damping vibrations applied thereto. Although in recent years there are increasing requirements for elastic mounts capable of more effectively damping or isolating noises and vibrations encountered in a motor vehicle, the conventional elastic mount is unsatisfactory in its vibration damping or isolating capability. At present, there is proposed a so-called fluid-filled cylindrical elastic mount having a fluid chamber or chambers which is/are filled with a suitable fluid, so that the elastic mount can exhibit improved damping or isolating characteristics.

An example of such a fluid-filled elastic mount is disclosed in laid-open Publication No. 62-288742 of unexamined Japanese Patent Application which is assigned to the assignee of the present application. The elastic mount disclosed in this publication has a fluid chamber which is formed between the inner and outer sleeves connected by the elastic body, and which is filled with a highly viscous fluid. In this fluid chamber, there is accommodated a flow-restricting block having external dimensions which are smaller by predetermined values than corresponding internal dimensions of the fluid chamber, so that a flow-restricting portion is formed around the flow-restricting block so as to permit the highly viscous fluid to flow therethrough when vibrations are applied between the inner and outer sleeves.

When a vibrational load is applied to the fluidfilled elastic mount described just above, shearing stresses are applied to masses of the highly viscous fluid existing in the flow-restricting portion of the fluid chamber, whereby the elastic mount is capable of exhibiting relatively high vibration damping characteristics which are not obtained by the conventional elastic mount which utilizes only elastic deformation of an elastic body for damping the input vibrations. Further, the fluid-filled elastic mount is capable of damping vibrations applied in the axial direction of the mount as well as those applied in the radial direction perpendicular to the axis of the mount, based on the fluid flows in the flow-restricting portion of the fluid chamber.

In the fluid-filled cylindrical elastic mount as described above, however, the highly viscous fluid is less likely to flow in the flow-restricting portion of the fluid chamber when the vibrations ar applied in the axial direction of the mount, than when the vibrations are applied in the radial directions of the mount. Therefore, an axial clearance between the axially opposite end faces of the flow-restricting block and the axially opposed inner walls of the fluid chamber should be set to a sufficiently small value, so that the mount can exhibit a sufficient effect of damping the vibrations applied in the axial direction of the mount. In this case, however, the elastic mount tends to have an unfavorably increased dynamic spring constant with respect to the input vibration applied in the radial directions perpendicular to the axis of the mount, due to the excessive flow restriction of the fluid in the flow-restricting portion of the fluid chamber. Accordingly, the known elastic mount is difficult to provide an effective damping effect with respect to the vibrations applied in the axial direction of the mount, while assuring sufficient damping and isolating characteristics with respect to the vibrations applied in the radial directions perpendicular to the axis of the mount.

SUMMARY OF THE INVENTION

The present invention was developed in view of the prior art situations as described above. It is therefore an object of the present invention to provide a fluid-filled cylindrical elastic mount which is capable of providing a high vibration damping effect based on flows of a highly viscous fluid contained therein, with respect to input vibrations applied in both axial and radial directions of the mount, while avoiding an excessive increase in a dynamic spring constant of the mount with respect to the radial vibrations.

The above object may be attained according to the principle of the invention, which provides a fluid-filled cylindrical elastic mount comprising: (a) an inner sleeve and an outer sleeve disposed radially outwardly of the inner sleeve with a predetermined radial distance therebetween; (b) an elastic body interposed between the inner and outer sleeves for elastically connecting the inner and outer sleeves, the elastic body at least partially defining at least one fluid chamber between the inner and outer sleeves, the elastic body including a pair of axially opposite walls which face each other in an axial direction of the elastic mount so as to partially define each of the at least one fluid chamber, the each fluid chamber being filled with a non-compressible fluid, (c) means for defining a pair of radially opposite walls which face each other in a radial direction of the elastic mount so as to partially define the each fluid chamber, (d) a flow-restricting member freely movably accommodated in the each fluid chamber, the flow-restricting member being movable in the axial direction so as to be brought into abutting contact with the axially opposite walls, and in the radial direction so as to be brought into abutting contact with the radially opposite walls, the flow-restricting member having dimensions smaller than internal dimensions of the corresponding fluid chamber, so as to provide a flow-restricting portion around the flow-restricting member, so that the fluid is forced to flow through the flow-restricting portion upon application of a vibrational load between the inner and outer sleeves, the flow-restricting member having a pair of opposite end faces which face the axially opposite walls, respectively, in the axial direction, the flow-restricting portion including a pair of axially spaced-apart sections which are defined by the axially opposite walls and the opposite end faces of the flow-restricting member, and a pair of radially spaced-apart sections which are defined by the radially opposite walls and the flow-restricting member, a sum of respective axial dimensions of the pair of axially spaced-apart sections as measured in the axial direction being not more than 4 mm, a sum of respective radial dimensions of the pair of radially spaced-apart sections as measured in the radial direction being not more than 4 mm, and (e) at least one of the pair of opposite end faces of the flow-restricting member having a plurality of grooves formed therein so as to extend substantially in the radial direction, the plurality of grooves being spaced apart from each other in a circumferential direction of the elastic mount, the plurality of grooves communicating with a corresponding one of the axially spaced-apart sections in the axial direction, and with the radially spaced-apart sections in the radial direction In the fluid-filled cylindrical elastic mount of the present invention constructed as described above, the sum of axially spaced-apart sections or clearances between the flow-restricting member and the axially opposite walls and the sum of radially spaced-apart sections or clearances between the flow-restricting member and the radially opposite walls each are sufficiently small, namely, not more than 4 mm, so as to provide a sufficiently high damping effect with respect to low-frequency vibrations received not only in the radial direction but also in the axial direction. In addition, for avoiding an undesired increase in the dynamic spring constant or spring stiffness with respect to medium- to high-frequency vibrations received in the radial direction, a plurality of grooves are formed in at least one of the axially opposite end faces of the flow-restricting member. Thus, the present elastic mount is capable of maintaining a sufficiently high effect of isolating the radially received medium- to high-frequency vibrations based on a sufficiently low dynamic spring constant.

The grooves indicated above may be provided in either one or both of the opposite end faces of the flow-restricting member. The flow-restricting member may have a generally arcuate or other suitable cross sectional shape as viewed in a plane perpendicular to the axial direction of the elastic mount.

In one form of the invention, the radially opposite walls are constituted by a first elastic layer covering an inner circumferential surface of the outer sleeve, and a second elastic layer covering an outer circumferential surface of the inner sleeve, respectively.

In another form of the present invention, the elastic mount has a pair of fluid chambers which are opposed to each other in a diametric direction of the elastic mount. In this case, the flow-restricting member is accommodated in each of the pair of fluid chambers. The fluid chambers may be formed such that a pair of pockets formed in diametrically opposite portions of the elastic body are fluid-tightly closed by the inner circumferential surface of the outer sleeve. According to one arrangement of this form of the invention, the elastic mount further comprises an intermediate sleeve which is interposed between the outer sleeve and the elastic body and which has a pair of part-circumferential grooves. The outer sleeve cooperates with these part-circumferential grooves to define a pair of fluid passages for fluid communication between the pair of fluid chambers.

The non-compressible fluid preferably has a kinematic viscosity of at least 1000 centistokes, and more preferably at least 10000 centistokes.

In use, the elastic mount may be oriented so that one of the inner and outer sleeves receives a static load in the axial direction. Where the elastic mount is used as a body mount for flexibly connecting the body of a motor vehicle to a suspension system, for example, the inner sleeve is fixed to a member of the vehicle suspension system while the outer sleeve is fixed t the vehicle body.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
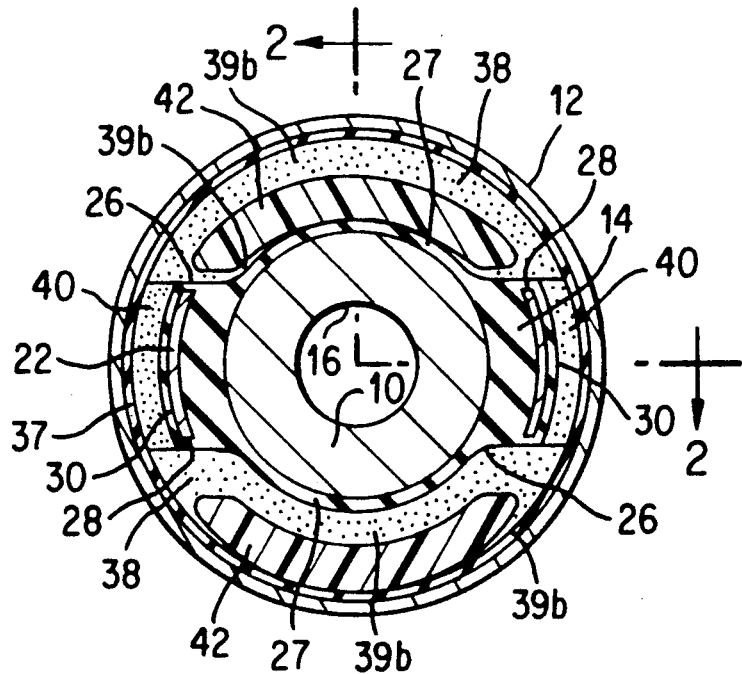
FIG. 1 is a view in transverse cross section of one embodiment of a fluid-filled cylindrical elastic mount of the present invention in the form of a body mount used for a motor vehicle.
Figure 2:
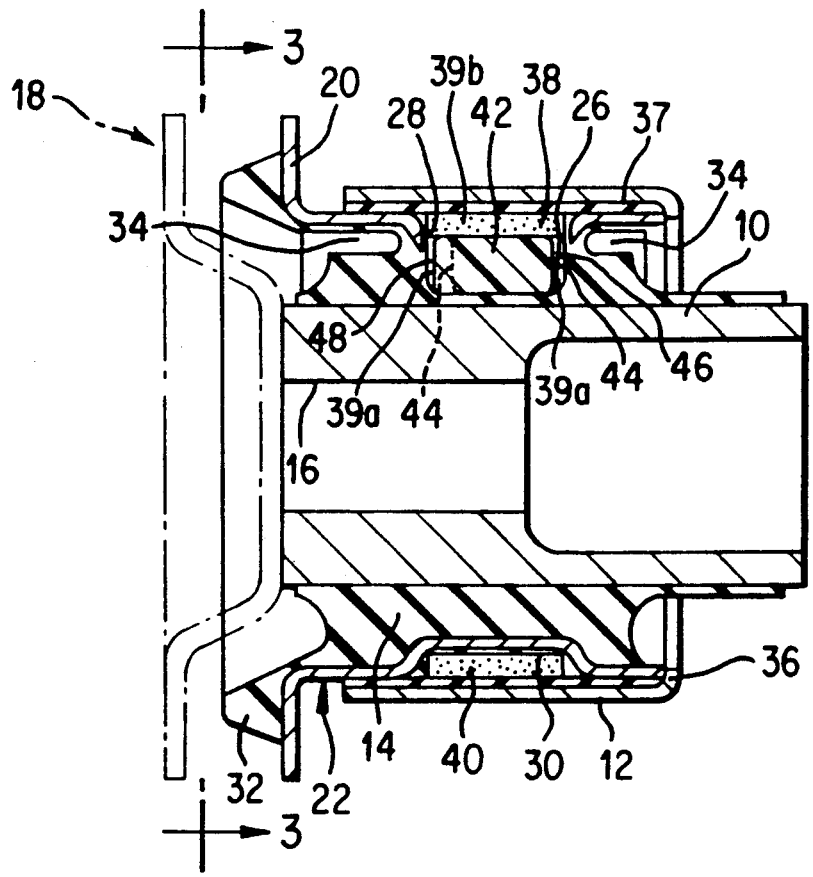
FIG. 2 is a cross sectional view taken along line 2—2 of FIG. 1.
Figure 3:
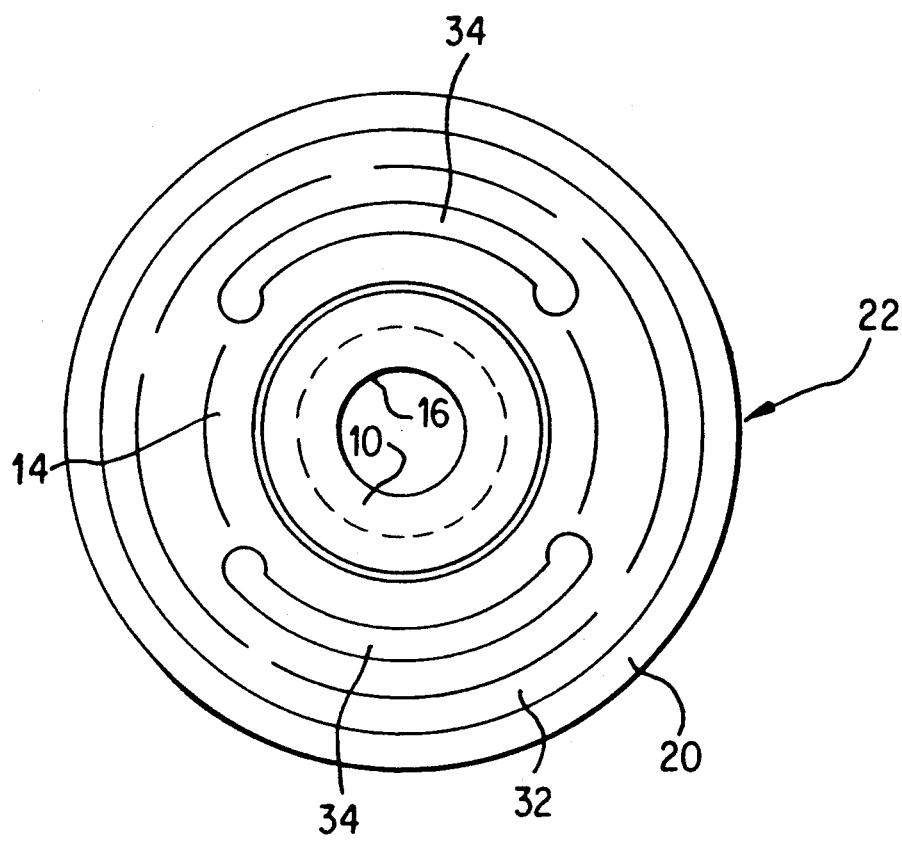
FIG. 3 is a view taken in the direction of arrows along line 3—3 of FIG. 1.

Referring first to FIGS. 1 through 3, reference numerals 10 and 12 denote an inner and an outer sleeve of a vehicle body mount, respectively, which are made of a metallic material. These inner and outer sleeves 10, 12 are spaced apart from each other with a suitable radial spacing therebetween. Between the inner and outer sleeves 10, 12, there is interposed a relatively thick-walled, generally annular elastic body 14 formed of a suitable rubber material. The elastic body 14 elastically connects the inner and outer sleeves 10, 12. In this body mount, the inner sleeve 10 is connected to a suspension member (not shown) of a motor vehicle such that a rod which is fixed to the suspension member is inserted through an inner bore 16 of the inner sleeve 10. On the other hand, the outer sleeve 12 is fixedly press-fitted in a mounting hole (not shown) formed in a frame of the vehicle body. Thus, the instant body mount is interposed between the suspension member and the vehicle body so that the suspension member may be flexibly mounted on the vehicle body in a vibration damping or isolating manner.

More specifically, the inner sleeve 10 is a cylindrical member having a relatively large radial wall thickness. Radially outwardly of the inner sleeve 10, there is disposed an intermediate sleeve 22 made of a metallic material, such that the inner sleeve 10 and the intermediate sleeve 22 are radially spaced apart from each other by a predetermined distance, and held in concentric or coaxial relationship with each other. This intermediate sleeve 22 is a cylindrical member having a relatively small radial wall thickness, and includes an integrally formed outward flange 20 formed at one of axially opposite ends thereof.

Figure 4:
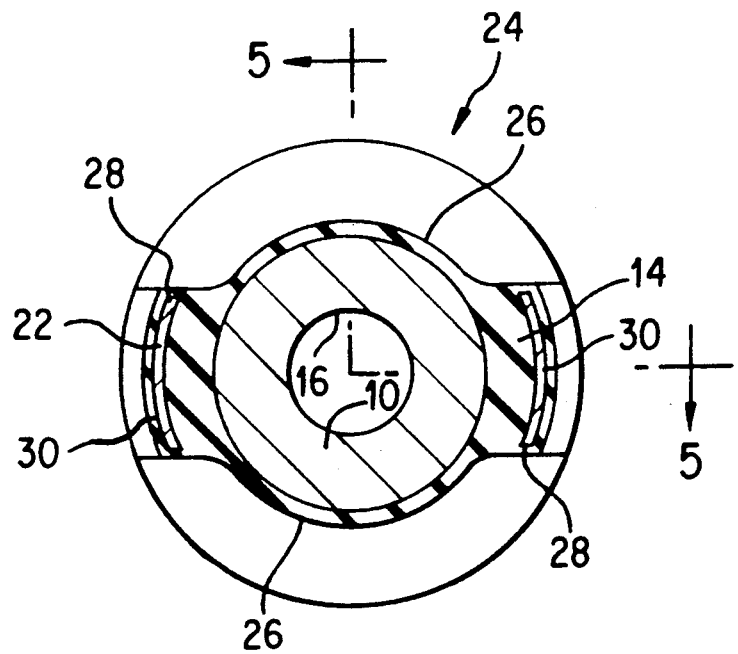
FIG. 4 is a view in transverse cross section of an intermediate product obtained by vulcanization of a rubber material during manufacture of the body mount of FIG. 1.
Figure 5:
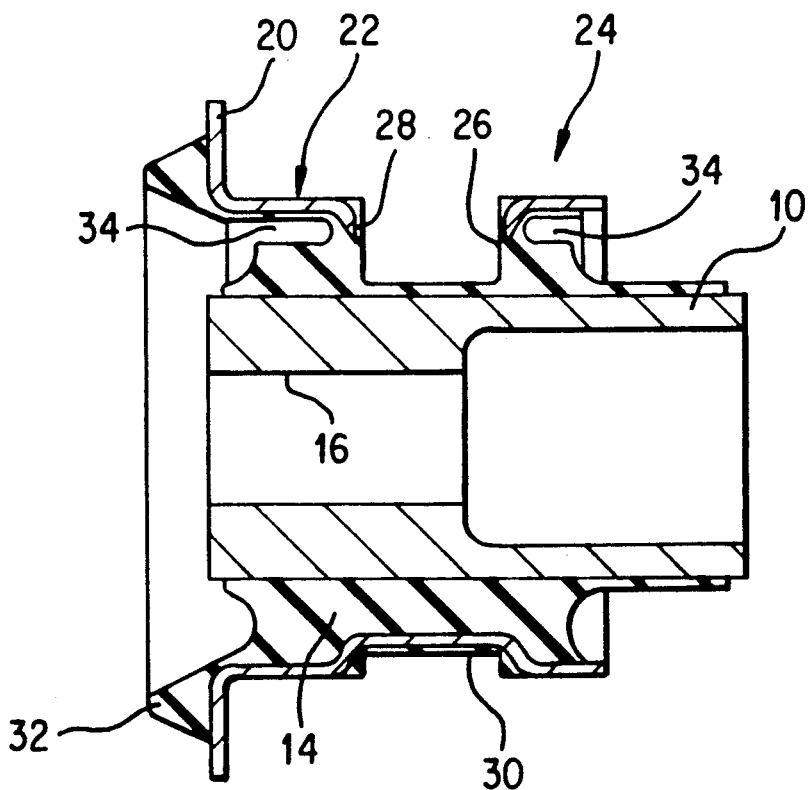
FIG. 5 is a cross sectional view taken along line 5—5 of FIG. 4.
Figure 6:
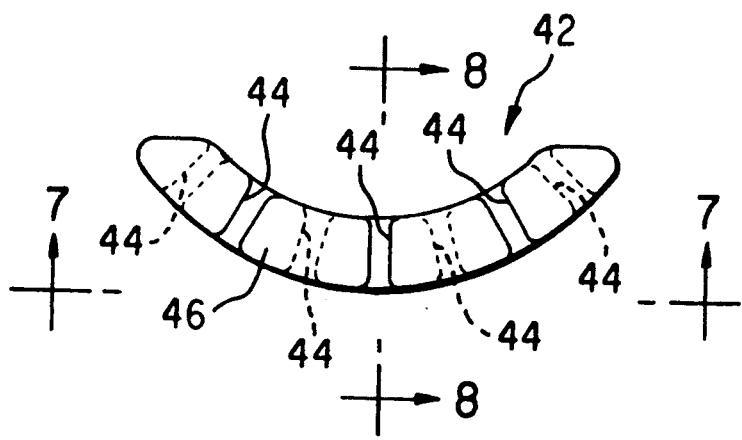
FIG. 6 is an enlarged view showing a movable block used in the body mount of FIG. 1.
Figure 7:
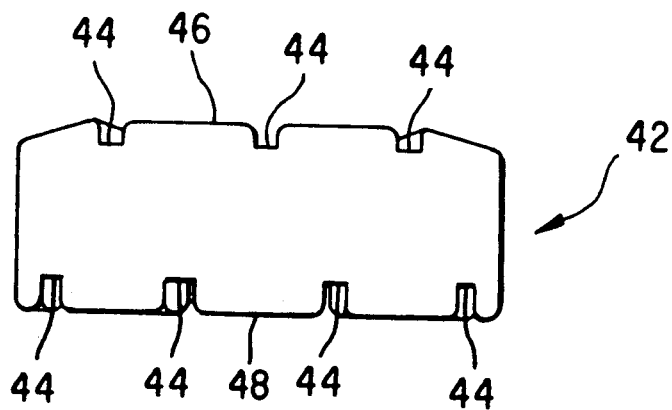
FIG. 7 is a view taken in the direction of arrows along line 7—7 of FIG. 6.
Figure 8:
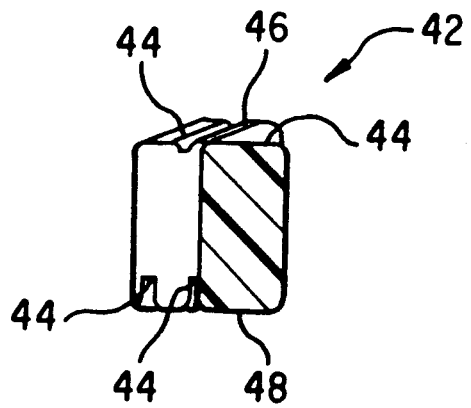
FIG. 8 is a cross sectional view taken along line 8—8 of FIG. 6.

As is apparent from FIGS. 4 and 5, the elastic body 14 is formed between the inner sleeve 10 and the intermediate sleeve 12. More specifically, the elastic body 14 is secured at its inner circumferential surface to the inner sleeve 10, and at its outer circumferential surface to the intermediate sleeve 22, by means of vulcanization of a rubber material for the elastic body 14. Thus, there is prepared an intermediate product 24 as an inner assembly of the body mount consisting of the inner sleeve 10, elastic body 14 and intermediate sleeve 22, during manufacture of the body mount. On the outer surface of the outward flange 20 of the intermediate sleeve 22, there is provided a stopper rubber portion 32 formed as a part of the elastic body 14, such that the stopper rubber portion 32 protrudes axially outwards from the outer surface of the flange 20, by a predetermined axial distance.

The elastic body 14 has a pair of pockets 26, 26 formed at respective axially intermediate portions thereof which are opposed to each other in one diametrical direction of the body mount. Each of the pockets 26 is formed over a suitable circumferential length of the annular elastic bod 14, as shown in FIG. 4. Consequently, the outer circumferential surface of the inner sleeve 10 is covered with rubber layers 27, 27 formed integral with the annular rubber body 14, which layers 27 define the bottoms of the pockets 26, respectively. The intermediate sleeve 22 has a pair of windows 28, 28 formed therethrough, which are aligned with the pockets 26 of the elastic body 14, so that the pockets 26 are open to the outer circumferential surface of the sleeve 22 (or the intermediate product 24), through these windows 28. In axially opposite end portions of the elastic body 14 which define the axial dimension of each pocket 26, there are formed respective arcuate voids 34, 34 each having a suitable axial depth, and the same circumferential length as the pocket 26, as shown in FIG. 3. Each of the arcuate voids 34 extends from corresponding one of the axially opposite end faces of the elastic body 34 toward the pocket 26, as shown in FIG. 5. In this arrangement, the elastic body 14 exhibits a comparatively soft spring characteristic with respect to input vibrations in the direction in which the pockets 26, 26 are diametrically opposed to each other.

The intermediate sleeve 22 has an axially intermediate portion whose diameter is smaller than that of axially opposite end portions thereof, as shown in FIG. 5. Thus, there are formed a pair of part-circumferential grooves 30, 30, each of which extends in the circumferential direction of the sleeve 22 between the corresponding circumferential ends of the windows 28, 28 of the sleeve 22. Namely, each part-circumferential groove 30 extends between the corresponding circumferential ends of the pockets 26, 26 which are open through the respective windows 28, 28, so that the groove 30 communicates with the pockets 26, 26.

The thus constructed intermediate product 24 is radially inwardly compressed at the intermediate sleeve 22, as needed, so that the elastic body 14 is pre-compressed by the sleeve 22. Thereafter, the outer sleeve 12 is fitted on the outer circumferential surface of the intermediate sleeve 22 (inner assembly 24), and then subjected to a drawing operation, so that the outer sleeve 12 is firmly fixed to the sleeve 22, as shown in FIGS. 1-3. The outer sleeve 12 is a relatively thin-walled, cylindrical member having a diameter larger by a predetermined value than that of the inner sleeve 12. This outer sleeve 12 has an integrally formed engaging portion 36 formed at one axial end thereof so as to extend radially inwards. When the outer sleeve 12 is mounted on the intermediate product 24, the engaging portion 36 engages the corresponding axial end of the intermediate sleeve 22.

The intermediate product or inner assembly 24 has a generally annular stopper metal member 18 which is secured to one axial end of the inner sleeve 10 near the outward flange 20 of the intermediate sleeve 22, as shown in FIG. 2. This stopper metal member 18 is opposed to the stopper rubber portion 32 of the elastic body 14 formed on the outer surface of the outward flange 20, in the axial direction of the body mount, with a suitable axial spacing therebetween. In this arrangement, the amount of relative displacement between the inner and outer sleeves 10, 12 in the axial direction of the mount is suitably limited by abutting contact of the stopper rubber portion 32 with the stopper metal member 18.

With the outer sleeve 12 mounted on the intermediate product 24 as described above, the openings of the pockets 26, 26 or the windows 28, 28 of the intermediate sleeve 22, and the openings of the part-circumferential grooves 30, 30 formed in the intermediate sleeve 22 are fluid-tightly closed by the outer sleeve 12. The inner circumferential surface of the outer sleeve 12 is almost entirely covered with a thin-walled sealing rubber layer 37 by means of vulcanization. This sealing rubber layer 37 is interposed and pressed by and between the outer sleeve 12 and the intermediate sleeve 22 upon installation of the outer sleeve 12, whereby fluid tightness at the interface of these sleeves 12, 22 is sufficiently ensured.

The thus closed pockets 26, 26 and grooves 30, 30 are filled with a suitable highly viscous fluid having a high kinematic viscosity, so that the pockets 26, 26 provide a pair of fluid chambers 38, 38, and the grooves 30, 30 provide a pair of fluid passages 40, 40 each of which is held in fluid communication with the two fluid chambers 30, 30.

The highly viscous fluid contained in the fluid chambers 30 and the fluid passages 40 is selected so that the body mount can provide a sufficiently high vibration damping effect, based on shearing stresses applied to the masses of the fluid upon application of vibrations. The fluid has a kinematic viscosity of preferably at least 1,000 centistokes, and more preferably at least 10,000 centistokes. For example, a viscous fluid such as a silicone oil is usually employed.

The filling of the fluid chambers 38 and the fluid passages 40 with the fluid as described above may be conducted by mounting the outer sleeve 12 on the intermediate product 24 within a mass of the selected fluid in a suitable vessel. However, this method requires a considerably cumbersome process to remove the fluid away from the surface of the obtained body mount after the filling operation. In view of the above, the filling operation may be effected in an alternative manner such that after the mounting of the outer sleeve 12, the fluid is poured into the fluid chambers 38 and fluid passages 40, through an inlet hole (not shown) formed through the outer sleeve 12, and the inlet hole is sealed with a rivet plug (not shown), for example.

When the outer sleeve 12 is mounted on the intermediate product 24, a flow-restricting member in the form of an arcuate movable block 42 is inserted into each of the pockets 26, 26 so that the movable block 42 is accommodated in each of the fluid chambers 38, 38. Each movable block 42 is a block-like member having a generally arcuate cross sectional shape, as seen in FIG. 1. The movable block 42 has a profile substantially following an inner shape of the corresponding fluid chamber 38, and has external dimensions which are more or less smaller than the dimensions of the inner walls of the fluid chamber 38. The movable block 42 has a plurality of grooves 44 formed in its axially opposite arcuate end faces 46, 48, which are opposite to each other in the axial direction of the mount, such that the grooves 44 extend in the radial directions of the mount or in directions of thickness of the movable block 42. The grooves 44 formed in each arcuate end face 46, 48 are equally spaced apart from each other by a predetermined distance, in the circumferential direction of the mount or longitudinal direction of the movable block 42. With the movable block 42 having the thus formed grooves 44, there are provided relatively large axial spacings or clearances between the axially facing walls of the fluid chamber 38 and the bottoms of the grooves 44 in the axial end faces 46, 48 of the movable block 42.

When the instant body mount is installed on the vehicle, the weight of the vehicle body is applied between the inner and outer sleeves 10, 12, thereby causing a predetermined amount of relative displacement between the inner and outer sleeves 10, 12 in the axial direction of the mount, resulting in a change in the shape of the fluid chambers 38. Therefore, the axially opposite end face 46 of each movable block 42 is inclined, as shown in FIG. 2, so that the inclined end face 46 of each movable block 42 follows the corresponding inner surface of the fluid chamber 38 after installation of the body mount.

The movable block 42 may be formed of any material provided it is not easily deformed and exhibits sufficient resistance to corrosion by the fluid. For example, a material such as metal, resin, or hard rubber materials is suitably used for the movable block 42, irrespective of the specific gravity of the selected material with respect to that of the fluid.

Due to the presence of the movable blocks 42, 42 accommodated within the respective fluid chambers 38, 38, each fluid chamber 38 is provided with a flow-restricting portion which is formed around the corresponding movable block 42 and defined between an outer surface of the block 42 and the inner walls of the fluid chamber 38. The flow-restricting portion formed in each fluid chamber 38 includes axially spaced-apart sections 39a, 39a which are defined between the axially opposed inner walls of the fluid chamber 38 and the axially opposite end faces 46, 48 of the corresponding movable member 42, and radially spaced-apart sections 39b, 39b which are defined between the radially opposed inner walls of the fluid chamber 38 and the radially opposite faces of the movable member 42, as shown in FIGS. 1 and 2. Each of these sections 39a, 39b functions as a narrow flow-restricting passage which provides a resistance to flows of the fluid. A sum of respective axial dimensions of the pair of axially spaced-apart sections 39a as measured in the axial direction is not more than 4 mm, while a sum of respective radial dimensions of the pair of radially spaced-apart sections as measured in the radial direction is not more than 4 mm. When vibrations are applied between the inner and outer sleeves 10, 12, the fluid in the fluid chambers 38 is forced to flow through the respective flow-restricting passages 39a, 39b, due to changes in the shape and volume of the fluid chambers 38 caused by elastic deformation of the elastic body 14.

In the thus constructed body mount, upon application of vibrations between the inner and outer sleeves 10, 12, shearing stresses are applied to the masses of the highly viscous fluid existing in the flow-restricting portion of the fluid chambers 38, based on flows of the fluid through the flow-restricting passages 39a, 39b. Consequently, the applied vibrations may be effectively damped based on the shearing stresses of the fluid masses. In the instant body mount, the fluid flows as described above take place when the vibrations are applied to the mount not only in the radial direction perpendicular to the axis of the mount, but also in the axial direction of the mount. Therefore, the instant body mount is able to provide a sufficient damping effect for the input vibrations applied in both axial and radial directions thereof, based on the shearing stresses applied to the fluid mass. The desired damping effect is obtained by suitably adjusting or tuning an axial clearance 39a, 39a between the axially opposed inner walls of each fluid chamber 38 and the axially opposite end faces 46, 48 of the corresponding movable block 42, and a radial clearance 39b, 39b between the radially opposed inner walls of the fluid chamber 38 and the radially opposite faces of the movable block 42.

More specifically, for assuring a sufficient damping effect for the vibrations applied in the axial direction of the mount, the axial clearance between the axially opposed inner walls of each fluid chamber 38 and the end faces 46, 48 of the corresponding movable block 42 is set to a comparatively small value, namely, not more than 4 mm, so that the considerably narrow axially spaced-apart sections 39a, 39a are formed in the fluid chamber 38. However, the instant body mount is prevented from exhibiting an unfavorably increased dynamic spring constant with respect to the vibrations applied in the radial direction of the mount, since the axial end faces 46, 48 of each movable block 42 are provided with the grooves 44 as described above. It is to be understood that the grooves 44 formed in each movable block 42 communicates with a corresponding one of the axially spaced-apart sections 39a, 39a in the axial direction of the mount, and with the radially spaced-apart sections 39b, 39b in the radial direction thereof.

The principle and operation have not been fully explicated with respect to the effect provided by the grooves 44 formed in the movable blocks 42, for avoiding an increase in the dynamic spring constant of the mount. Hereinafter, there will be described the operation of the instant body mount as considered by the inventor a the time of filing of the present application. In the body mount constructed as described above, when the vibrations are applied between the inner and outer sleeves 10, 12 in the radial direction perpendicular to the axis of the mount, shearing stresses are applied to the fluid masses in the radially spaced-apart sections 39b, 39b of the flow-restricting portion so as to damp the radially applied vibrations, based on the flows of the fluid existing in these sections 39b, 39b. When the vibrations are applied in the axial direction of the mount, on the other hand, shearing stresses are applied to the fluid masses in the axially spaced-apart sections 39a, 39a of the flow-restricting portion so as to damp the axially applied vibrations, based on the flows of the fluid existing in these sections 39a, 39a. Upon application of the vibrations in the radial direction of the mount, the fluid existing in the radially spaced-apart sections 39b, 39b is forced to flow instantaneously into the grooves 44 formed in the axial end faces 46, 48 of the movable blocks 42, so that the pressure increase in these sections 39b, 39b can be effectively avoided.

The instant body mount is able to effectively damp the vibrations applied in the axial direction of the mount, as well as the vibrations applied in the radial direction of the mount, by providing the considerably narrow axially spaced-apart sections 39a, 39a between the movable block 42 and the inner walls of the fluid chamber 38. Thus, the body mount is capable of providing a considerably high damping effect with respect to relatively low-frequency vibrations such as engine shakes or shimmy. Since the grooves 44 function to avoid an excessive increase in the dynamic constant of the mount which would be otherwise induced by the narrowed sections 39a, 39a, the instant body mount is also capable of providing an excellent isolating effect with respect to middle- to high-frequency vibrations such as booming noises and road-oriented noises, with the dynamic spring constant of the mount being held at a sufficiently low value, thereby assuring a significantly improved driving comfort of the vehicle.

In the instant body mount, the movable blocks 42 are accommodated in the respective fluid chambers 38 such that the blocks 42 are freely movable within the chambers 38. Therefore, when the inner and outer sleeves 10, 12 are displaced relative to each other upon application of the vibrations in the axial direction of the mount, the movable block 42 may be moved upon abutting contact of the axially facing walls of the elastic body 14 with the movable block 42, whereby the instant body mount is free from otherwise possible damages of the elastic body 14, and from otherwise possible disturbance of the relative displacement between the inner and outer sleeves 10, 12.

The body mount of the instant embodiment has only one pair of fluid chambers 38 which have the respective flow-restricting portions (39a, 39b) formed therein, and which are opposed to each other in one diametrical direction of the mount. Therefore, the mount exhibits two different spring characteristics in the above-indicated one diametrical direction, and in the diametrical direction perpendicular to the above-indicated one diametrical direction. In this arrangement, the present body mount can be oriented so that the mount exhibits a relatively soft spring characteristic (low spring stiffness) with respect to the load applied in the longitudinal or front-rear direction of the vehicle, and a relatively hard spring characteristic (high spring stiffness) with respect to the load applied in the transverse or right-left direction of the vehicle, thereby assuring an excellent driving comfort of the vehicle and a significantly improved controllability or running stability of the vehicle.

While the present invention has been described in detail in its presently preferred embodiment, for illustrative purposes only, it is to be understood that the invention is not limited to the details of the illustrated embodiment.

While the body mount has one pair of fluid chambers 38, 38 in the illustrated embodiment, the number and position of the fluid chamber or chambers are not limited to those of the illustrated embodiment, but may be suitably determined depending upon a direction or directions of application of input vibrations, and a required vibration damping or isolating effect of the mount. For example, it is possible to form three or more fluid chambers in the body mount.

It is also possible to provide the body mount with a fluid chamber which is formed over the entire circumference of the mount. In this case, a single movable member may be accommodated in the fluid chamber so as to extend over the entire circumference of the fluid chamber, or a plurality of movable members may be disposed in the fluid chamber along the circumference of the fluid chamber. The thus constructed body mount is capable of exhibiting a high vibration damping effect based on the shearing stresses applied to a mass of the highly viscous fluid, with respect to input vibrations applied in any radial directions perpendicular to the axis of the mount.

In the illustrated embodiment, the grooves 44 are formed in both of the axially opposite end faces 46, 48 of the movable block 42. However, the grooves 44 may be formed in only one of the axially opposite end faces of the block. In this case, the above-described effect of the grooves 44 is enjoyed to some extent to avoid an unfavorable increase in the dynamic spring constant of the mount.

The width or depth of each groove 44, and the number of the grooves 44 formed in the movable block 42 are not limited to any specific values, but may be changed as needed. However, the width of each groove 44 and the number of the grooves 44 should not be too large, for obtaining a sufficient vibration damping effect based on shearing of the fluid masses in the axially spaced-apart sections 39a, 39a of the fluid chamber 38. Therefore, it is desirable to avoid an increase in the dynamic spring constant of the mount, by increasing the depth of the grooves 44, for example, rather than by increasing the number and/or width of the grooves 44.

Although the illustrated embodiment is adapted to be used as a body mount for a motor vehicle, the concept of the invention may be embodied as member mounts, engine mounts, differential mounts or suspension bushings for a motor vehicle, and as other types of fluid-filled elastic mounts whose applications are not limited to the motor vehicle.

It is to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount comprising:
   an inner sleeve and an outer sleeve disposed radially outwardly of said inner sleeve with a predetermined radial distance therebetween;
   an elastic body interposed between said inner and outer sleeves for elastically connecting the inner and outer sleeves;
   said elastic body at least partially defining at least one fluid chamber between said inner and outer sleeves, said elastic body including a pair of axially opposite walls which face each other in an axial direction of the elastic mount so as to partially define each of said at least one fluid chamber, said each fluid chamber being filled with a non-compressible fluid;

means for defining a pair of radially opposite walls which face each other in a radial direction of the elastic mount so as to partially define said each fluid chamber;

a flow-restricting member freely movably accommodated in said each fluid chamber, said flow-restricting member being movable in said axial direction so as to be brought into abutting contact with said axially opposite walls, and in said radial direction so as to be brought into abutting contact with said radially opposite walls, said flow-restricting member having dimensions smaller than internal dimensions of the corresponding fluid chamber, so as to provide a flow-restricting portion around said flow-restricting member, so that said fluid is forced to flow through said flow-restricting portion upon application of a vibrational load between said inner and outer sleeves;

said flow-restricting member having a pair of opposite end faces which face said axially opposite walls, respectively, in said axial direction, said flow-restricting portion including a pair of axially spaced-apart sections which are defined by said axially opposite walls and said opposite end faces of said flow-restricting member, and a pair of radially spaced-apart sections which are defined by said radially opposite walls and said flow-restricting member, a sum of respective axial dimensions of said pair of axially spaced-apart sections as measured in said axial direction being not more than 4 mm, a sum of respective radial dimensions of said pair of radially spaced-apart sections as measured in said radial direction being not more than 4 mm; and at least one of said pair of opposite end faces of said flow-restricting member having a plurality of grooves formed therein so as to extend substantially in said radial direction, said plurality of grooves being spaced apart from each other in a circumferential direction of the elastic mount, said plurality of grooves communicating with a corresponding one of said axially spaced-apart sections in said axial direction, and with said radially spaced-apart sections in said radial direction.

2. A fluid-filled cylindrical elastic mount according to claim 1, wherein each of said opposite end faces of said flow-restricting member has said plurality of grooves.

3. A fluid-filled cylindrical elastic mount according to claim 1, wherein said flow-restricting member has a generally arcuate cross sectional shape as viewed in a plane perpendicular to said axial direction of the elastic mount.

4. A fluid-filled cylindrical elastic mount according to claim 1, wherein said means for defining a pair of radially opposite walls comprises a first elastic layer covering an inner circumferential surface of said outer sleeve, and a second elastic layer covering an outer circumferential surface of said inner sleeve.

5. A fluid-filled cylindrical elastic mount according to claim 1, wherein said at least one fluid chamber consists of a pair of fluid chambers which are opposed to each other in a diametric direction of said elastic mount, and said flow-restricting member is accommodated in each of said pair of fluid chambers.

6. A fluid-filled cylindrical elastic mount according to claim 5, wherein said elastic body has a pair of pockets formed therein in diametrically opposite portions thereof, said pockets being fluid-tightly closed by said outer sleeve into said pair of fluid chambers.

7. A fluid-filled cylindrical elastic mount according to claim 5, further comprising an intermediate sleeve interposed between said outer sleeve and said elastic body, said intermediate sleeve having a pair of part-circumferential grooves which cooperate with said outer sleeve to define a pair of fluid passages for fluid communication between said pair of fluid chambers.

8. A fluid-filled cylindrical elastic mount according to claim 1, wherein said non-compressible fluid has a kinematic viscosity of at least 1000 centistokes.

9. A fluid-filled cylindrical elastic mount according to claim 1, wherein said non-compressible fluid has a kinematic viscosity of at least 10000 centistokes.

10. A fluid-filled cylindrical elastic mount according to claim 1, wherein one of said inner and outer sleeves receives a static load in said axial direction.

11. A fluid-filled cylindrical elastic mount according to claim 1, wherein said inner sleeve is fixed to a member of a suspension system of a motor vehicle, while said outer sleeve is fixed to a body of said vehicle.

12. A fluid-filled cylindrical elastic mount according to claim 1, wherein said flow-restricting member has a profile substantially following an inner shape of the corresponding fluid chamber.

* * * * *